A. COPONY.
DECKING SYSTEM.
APPLICATION FILED JULY 23, 1917.
1,254,312.
Patented Jan. 22, 1918.
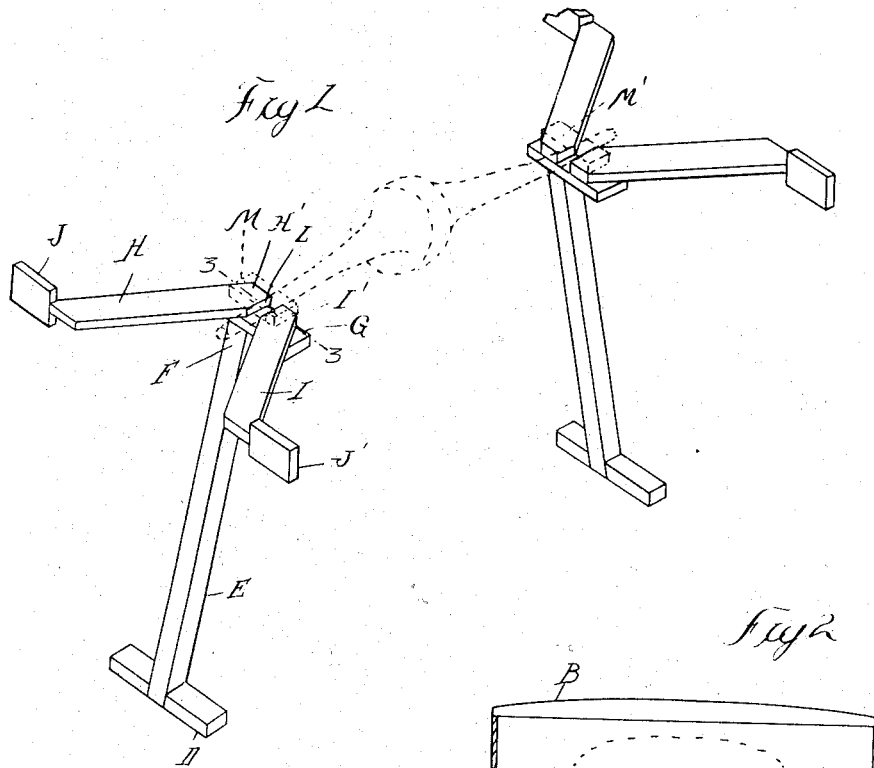
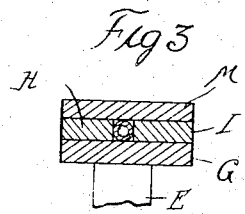
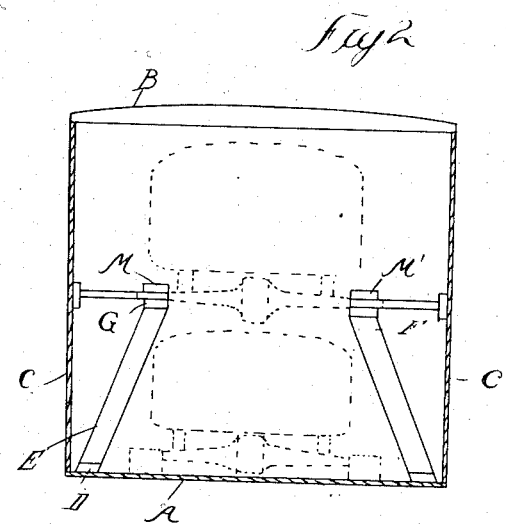
Inventor
Alfred Copony
By Whittemore, Hulbert & Whittemore
Attorneys

UNITED STATES PATENT OFFICE.

ALFRED COPONY, OF DETROIT, MICHIGAN, ASSIGNOR TO COPONY AUTO-LOADING COMPANY, OF DETROIT, MICHIGAN, A CORPORATION OF MICHIGAN.

DECKING SYSTEM.

1,254,312.     Specification of Letters Patent.     Patented Jan. 22, 1918.

Application filed July 23, 1917. Serial No. 182,211.

*To all whom it may concern:*

Be it known that I, ALFRED COPONY, a subject of the Emperor of Austria, residing at Detroit, in the county of Wayne and State of Michigan, have invented certain new and useful Improvements in Decking Systems, of which the following is a specification, reference being had therein to the accompanying drawings.

This invention relates to decking systems for loading automobiles or the like, and refers more particularly to an improved and simplified arrangement for decking automobiles one above another in freight cars of the usual construction.

Among the objects of the invention are to provide a construction which will support an automobile in a position adjacent the top of the car so as to provide beneath this automobile sufficient clearance for placing a second vehicle or the like; to provide a construction which will have an effective bracing and in which the axle members of the automobile are so positioned with reference to the brace members as to transmit the stress longitudinally of such brace members; to provide a construction which can be made from standard sizes of lumber if desired; and in general to provide an improved and simplified construction of the character referred to.

In the drawings:

Figure 1 is a perspective view of two of the supporting frames;

Fig. 2 is a vertical transverse section through a freight car to which my invention is applied;

Fig. 3 is a cross sectional view on the line 3—3 of Fig. 1.

Describing in detail the particular embodiment of my invention shown in the drawings, A designates the floor of a freight car, B the top of the car and C and C' the sides of the freight car. In the shipping of automobiles, it is desirable to double deck the automobiles if possible, that is, to store one automobile above the other so that where the freight car would normally receive three or four automobiles, it can, by the use of my invention, conveniently carry twice that number.

While means have been employed for supporting the automobiles and holding them from sidewise movement, the present invention contemplates an improved device wherein the axle members of the automobile are so positioned and arranged on the supporting frames as to coöperate in rigidly holding the automobile in place.

In detail the supporting frames are arranged in pairs, the construction of each of which is as follows: Extending upwardly from a base cleat D is a diagonally arranged standard E which has its upper end F spaced inwardly from the side of the car. To this upper end there is fastened a cross member G and in turn there is secured to this cross member the inner ends H' and I' of diagonally-extending brace members H and I. The opposite ends of these brace members H and I are nailed or otherwise secured to the side of the car and perferably located between cleats J and J' also secured to the side of the car.

Two of these frames are employed at each end of the automobile, the frames of each pair being arranged in reverse position, as shown in Fig. 1. The automobile to be supported adjacent the roof B of the car is placed so that each of its axle members rests upon the frame members and preferably in recesses L left between the spaced ends of the diagonal brace members. After the axle member has been placed in the recesses or grooves L, cleat members M and M' are nailed down over the axle member, as shown in Fig. 3, so that the automobile is locked in fixed relation to the supporting frame. This interlocking arrangement between the axle member and the frame member has a further advantage, in that, any stresses are transmitted longitudinally to the diagonal brace members H and I of each of the frames. Not only does this produce a cheap and effective bracing, but it allows sufficient space for the storage of a second automobile or the like beneath the one positioned on top of the frame members. Also owing to the diagonal arrangement of the members E, H and I with reference to the floor and sides of the car, a very effective triangular bracing is maintained against movement in either the vertical or horizontal planes.

Various changes in the details of construction and arrangements and combinations of parts can be made within the scope of my invention.

What I claim as my invention is:—

1. In a decking system for automobiles or the like in freight cars, the combination with a brace member extending diagonally upward from the floor of the car and inwardly from the side thereof, of a transverse brace member coöperating with said first-mentioned brace member.

2. In a decking system for automobiles or the like in freight cars, the combination with a brace member extending diagonally upward from the floor of the car and inwardly from the side thereof, of brace members coöperating therewith and extending diagonally inward from the sides of the car.

3. In a decking system for automobiles or the like in freight cars, the combination with a brace member extending diagonally upward from the floor of the car and inwardly from the side thereof, of brace members coöperating therewith and extending diagonally inward from the sides of the car and toward each other.

4. In a decking system for automobiles or the like in freight cars, the combination with a brace member extending diagonally upward from the floor of the car and inwardly from the side thereof, of brace members coöperating therewith and extending diagonally inward from the sides of the car and toward each other, the inner ends of said last-mentioned brace member being spaced from each other to provide a recess within which the axle member of the automobile can be fastened.

In testimony whereof I affix my signature.

ALFRED COPONY.

Copies of this patent may be obtained for five cents each, by addressing the "Commissioner of Patents, Washington, D. C."